US012812431B2

(12) United States Patent
Liu

(10) Patent No.: US 12,812,431 B2
(45) Date of Patent: Nov. 24, 2026

(54) METHOD FOR INDICATING TO PROCESS MEASUREMENT RESULT, AND TERMINAL DEVICE

(71) Applicant: GUANGDONG OPPO MOBILE TELECOMMUNICATIONS CORP., LTD., Dongguan (CN)

(72) Inventor: Yang Liu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 18/319,910

(22) Filed: May 18, 2023

(65) Prior Publication Data

US 2023/0354078 A1 Nov. 2, 2023

Related U.S. Application Data

(63) Continuation of application No. PCT/CN2021/076166, filed on Feb. 9, 2021.

(51) Int. Cl.
*H04W 24/10* (2009.01)
*H04W 74/0833* (2024.01)

(52) U.S. Cl.
CPC ........ *H04W 24/10* (2013.01); *H04W 74/0833* (2013.01)

(58) Field of Classification Search
CPC ........................................ H04W 24/10
See application file for complete search history.

(56) References Cited

U.S. PATENT DOCUMENTS

2014/0248842 A1* 9/2014 Yi .................... H04W 24/10 455/67.11
2017/0105136 A1* 4/2017 Reider ................ H04W 24/10
2017/0303157 A1* 10/2017 Siomina ............... H04W 4/06
2018/0270688 A1* 9/2018 Jung .................. H04W 36/0088
2021/0120448 A1 4/2021 Zhang et al.
2022/0022078 A1 1/2022 Kim et al.
2022/0046456 A1* 2/2022 Kumar ................. H04W 24/10

FOREIGN PATENT DOCUMENTS

CN 102149106 A 8/2011
CN 109309969 A 2/2019
CN 109474953 A 3/2019
(Continued)

OTHER PUBLICATIONS

International search report,International Application No. PCT/CN2021/076166, mailed Jun. 29, 2021 (15 pages).
(Continued)

*Primary Examiner* — Charles C Jiang
*Assistant Examiner* — Thad N Defauw
(74) *Attorney, Agent, or Firm* — Ladas & Parry LLP

(57) ABSTRACT

Embodiments of the present disclosure provide a method for instructing to process a measurement result, and a terminal device. The method includes receiving a first indication sent by a network device; wherein the first indication is configured to indicate a way to record a measurement result measured based on an idle mode measurement configuration, and/or to indicate a way to report the measurement result measured based on the idle mode measurement configuration.

8 Claims, 6 Drawing Sheets

(56) References Cited

FOREIGN PATENT DOCUMENTS

| | | | |
|---|---|---|---|
| CN | 111278043 | A | 6/2020 |
| WO | 2020001586 | A1 | 1/2020 |
| WO | 2020167187 | A1 | 8/2020 |
| WO | 2020175868 | A1 | 9/2020 |

OTHER PUBLICATIONS

Radio Resource Control (RRC);Protocol specification : 3GPP TS 38.331 version 16.1.0 Release 16.

SAMSUNG: "Supporting MDT for RRC_Idle and RRC_Inactive", 3GPP Draft; R2-1907769, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019 (May 3, 2019), XP051712044(4 pages).

European Search Report, European Patent Application No. 21925136.0, mailed Nov. 20, 2023 (8 pages).

European Examination Report, European Application No. 21925136.0, mailed Jul. 29, 2024 (11 pages).

Second Office Action of the European application No. 21925136.0, issued on Jan. 23, 2025. 10 pages.

First Office Action of the Chinese application No. 202311702101.9, issued on Jan. 25, 2025. 13 pages with English translation.

Second Office Action of the Chinese application No. 202311702101.9, issued on May 17, 2025. 12 pages with English translation.

* cited by examiner

METHOD FOR INDICATING TO PROCESS MEASUREMENT RESULT, AND TERMINAL DEVICE

CROSS REFERENCE

The present disclosure is a continuation-application of International (PCT) Patent Application No. PCT/CN2021/076166, filed on Feb. 9, 2021, the entire contents of which are hereby incorporated by reference in their entirety.

TECHNICAL FIELD

The present disclosure relates to the field of communication technologies, and in particular to a method for indicating to process a measurement result, and a terminal device.

BACKGROUND

In the logged minimization of drive tests (MDT) approach in R17, the terminal device needs to record an idle state measurement result in the measurement report and report the result to the network device. If the network device does not need the idle state measurement result to be reported, but only needs the terminal device to report measurement parameters based on cell reselection, the terminal device reporting the idle state measurement result will meaninglessly increase the additional network signaling overhead and make the network device processing measurement reports less efficient.

SUMMARY OF THE DISCLOSURE

The embodiments of the present disclosure provide a method for indicating to process a measurement result, a terminal device, and a network device, which can solve the problem that when the network device does not need the idle state measurement results, the terminal device reporting the idle state measurement results will meaninglessly increase the additional network signaling overhead and also make the network device less efficient in processing the measurement reports.

In a first aspect, the present disclosure provides a method for indicating to process a measurement result, comprising: receiving a first indication sent by a network device; wherein the first indication is configured to indicate a way to record a measurement result measured based on an idle mode measurement configuration, and/or to indicate a way to report the measurement result measured based on the idle mode measurement configuration.

In a second aspect, the present disclosure provides a method for indicating to process a measurement result, comprising: sending a first indication sent to a terminal device; wherein the first indication is configured to indicate a way to record a measurement result measured based on an idle mode measurement configuration, and/or to indicate a way to report the measurement result measured based on the idle mode measurement configuration.

In a third aspect, the present disclosure provides a terminal device, comprising: a receiving module, configured to receive a first indication sent by a network device; wherein the first indication is configured to indicate a way to record a measurement result measured based on an idle mode measurement configuration, and/or to indicate a way to report the measurement result measured based on the idle mode measurement configuration.

In a fourth aspect, the present disclosure provides a network device, comprising: a transmitting module, configured to send a first indication sent to a terminal device; wherein the first indication is configured to indicate a way to record a measurement result measured based on an idle mode measurement configuration, and/or to indicate a way to report the measurement result measured based on the idle mode measurement configuration.

In a fifth aspect, the present disclosure provides a terminal device, comprising: a receiver, configured to receive a first indication sent by a network device; wherein the first indication is configured to indicate a way to record a measurement result measured based on an idle mode measurement configuration, and/or to indicate a way to report the measurement result measured based on the idle mode measurement configuration.

In a sixth aspect, the present disclosure provides a network device, comprising: a transmitter, configured to send a first indication sent to a terminal device; wherein the first indication is configured to indicate a way to record a measurement result measured based on an idle mode measurement configuration, and/or to indicate a way to report the measurement result measured based on the idle mode measurement configuration.

In a seventh aspect, the present disclosure provides a computer-readable storage medium, comprising computer instructions; wherein when the computer instructions are executed on a computer, the computer is caused to perform the method in the first aspect or in any of optional implementations of the first aspect, or to perform the method in the second aspect or in any of optional implementations of the second aspect.

In an eighth aspect, the present disclosure provides a computer program product including, computer instructions; wherein when the computer program product is executed on a computer, the computer runs the computer instructions such that the computer performs the method in the first aspect or in any of optional implementations of the first aspect, or the method in the second aspect or in any of optional implementations of the second aspect.

In a ninth aspect, the present disclosure provides a chip coupled with a memory in a terminal device, such that the chip calls the program indications stored in the memory at runtime, causing the terminal device to perform the method in the first aspect or in any of optional implementations of the first aspect, or causing the network device to perform the method in the second aspect or in any of optional implementations of the second aspect.

DETAILED DESCRIPTION

Figure 1:
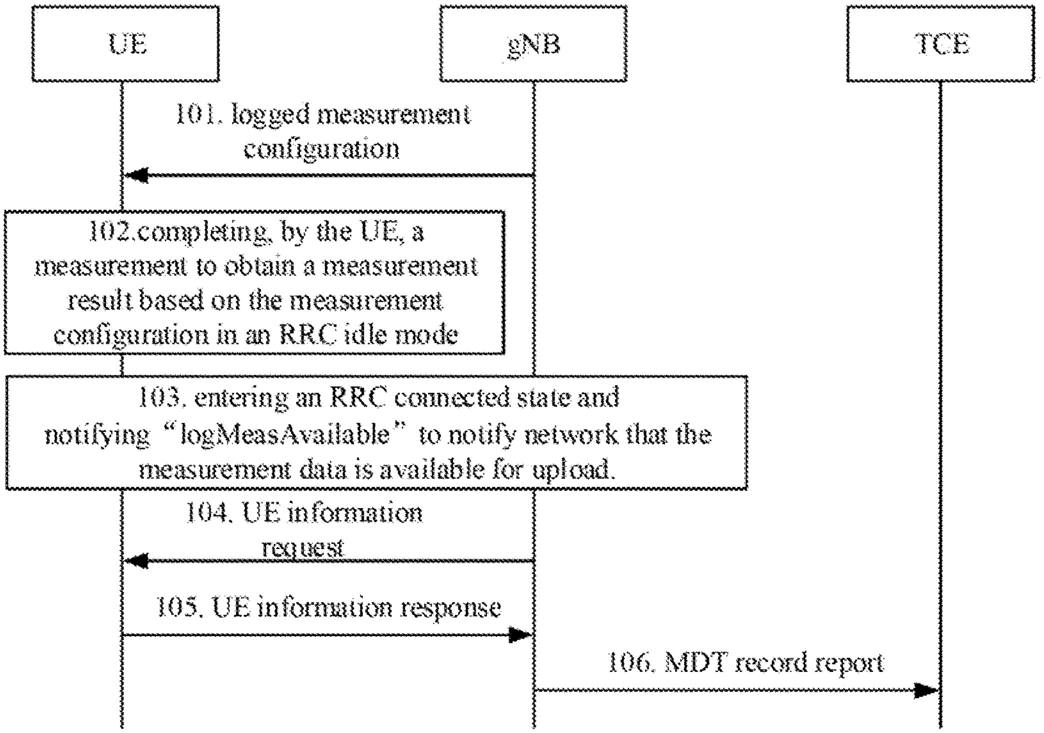
FIG. 1 is a schematic view of a method for recording and reporting measurement results of an idle state by a UE according to an embodiment of the present disclosure.

The technical solutions in the embodiments of the present disclosure will be described below in conjunction with the accompanying drawings in the embodiments of the present disclosure. Obviously, the embodiments described are only a part of the embodiments of the present disclosure, and not all of them. Based on the embodiments in the present disclosure, all other embodiments obtained by those skilled in the art without making creative labor fall within the scope of the present disclosure.

In the embodiments of the disclosure, the terms "exemplary" or "for example" are intended to indicate an example, illustration, or description. Any embodiment or design solution described as "exemplary" or "for example" in the embodiments of the present disclosure should not be construed as superior or more advantageous than other embodiments or design solutions. Rather, the use of the terms "exemplary" or "for example" is intended to present the relevant concepts in a specific manner.

The term "and/or" in this specification is simply a description of an association of related objects, indicating that three relationships can exist, e.g., A and/or B, which can mean: A alone, both A and B, and B alone. The symbol "/" herein indicates a relationship in which the associated object is or, for example, A/B indicates A or B.

In the description of the present disclosure, unless otherwise specified, "plurality" means two or more.

Part I: Logged Minimization of Drive Tests (MDT) Process

Conventionally, in order to understand the performance of a mobile network, the mobile network builder or network operator would apply drive tests to obtain measurement parameters that reflect the current network performance. Specifically, a driving car is used to collect a series of measurement parameters that reflect the current network performance, such as downlink signal quality/interference, along a fixed route; then, based on the collected measurement parameters about the network performance, the deployment of mobile network devices, the strength of mobile network signals, and the angle of mobile network antennas may be adjusted to improve the performance of the mobile network and the user's satisfaction. However, the disadvantage of this approach is that as the scale of mobile networks increases, the drive tests become more time-consuming and labor-intensive, which is not conducive to timely adjustment of network deployment by the mobile operator and consumes large costs.

Based on above, a signal acquisition method called MDT is introduced in mobile networks, and its core idea is to enable many terminal devices to report their signal acquisition volume with the permission of the terminal devices. With a sufficient number of terminal devices, the network can quickly and economically obtain the measurement parameters of the network performance in an area. This way of collecting the measurement parameters of the network performance of terminal devices in a certain target area is called management-based MDT.

MDT is also used to help the network collect data related to network performance of a specific terminal device (e.g., the user of the terminal device often complains about poor network performance), and this MDT acquisition method is called signaling-based MDT. The MDT profile is sent to the terminal device through the 5G core network control plane element or network manager (OAM), the terminal device completes the acquisition and uploads the measurement reports to the base station, and the base station sends the measurement reports to an independent MDT data analysis element (trace collection entity, TCE).

The MDT configuration signaling is sent from the network device to the terminal device when the terminal device is in a connected state. In a case that the network device is configured with logged MDT measurement configuration, in condition of the terminal device reverting to the RRC_idle state, the terminal device will report the logged network performance measurement parameters (i.e., idle state) to the network device when it restoring to the connected state.

Exemplarily, referring to FIG. 1, FIG. 1 is a schematic view of a method for recording and reporting measurement results of an idle state by a UE according to an embodiment of the present disclosure. The method includes operations as followed.

Step 101: sending, by a gNB, a logged measurement configuration to a UE.

Step 102: completing, by the UE, a measurement to obtain a measurement result based on the measurement configuration in an RRC idle mode.

After the UE receives the logged measurement configuration, the UE will record the measurement result in an idle mode in the idle mode.

Step 103: after entering an RRC connected state, notifying, by the UE, the gNB of an existence of the measurement result to be uploaded.

In some embodiments, the UE may notify the gNB of the existence of the measurement result to be uploaded by indicating "logMeasAvailable" to the gNB.

Step 104: sending, by the gNB, a UE information request to the UE.

Step 105: sending, by the UE, a UE information response to the gNB.

Step 106: sending, by the gNB, an MDT record report, to a trace collection entity (TCE).

The current logged MDT supports two types of measurement parameter record triggering, which are periodic and event triggering. When the triggering method is periodic, the UE records the measured measurement parameters at regular intervals. When the triggering method is event triggering and the event type is set to eventL1, the UE records the measured parameters at a specified time interval when the condition indicated by eventL1 is satisfied.

Part II: Early Measurement (IdleModeMeasurement) Configuration

Figure 2A:
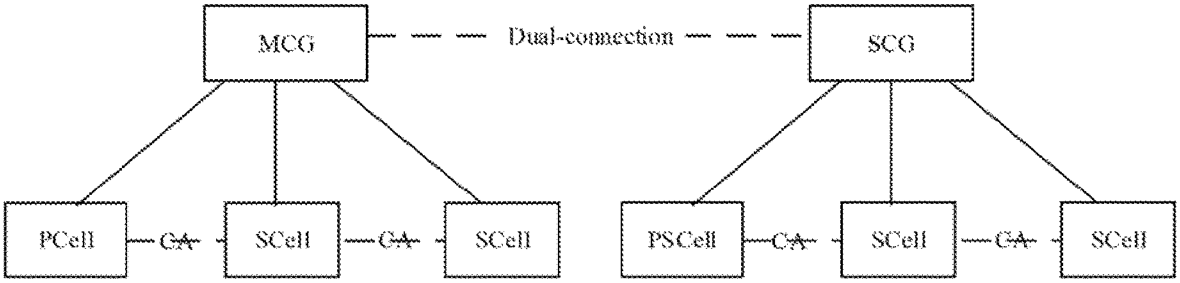
FIG. 2A is a schematic view of an architecture of a dual connection system according to an embodiment of the present disclosure.

Referring to FIG. 2A, FIG. 2A is a schematic view of an architecture of a dual connection system according to an embodiment of the present disclosure, where the dual connection scenario includes a master cell group (MCG), and a secondary cell group (SCG). The MCG is formed by carrier aggregation (CA) of a primary component carrier (PCC) of one PCell and secondary component carriers (SCCs) of two SCells. The SCG is formed by carrier aggregation of a PCC of one PCell and SCCs of two SCells. The PCell of SCG is also called primary SCG cell (PSCell).

In a Cell Group, there is only one PCC, which provides RRC signaling connection, NAS function, etc. The SCC provides additional radio resources, and both PCC and SCC are called service cells, with PCC corresponding to primary service cell (PCell) and SCC corresponding to secondary service cell (SCell).

For terminal devices that support CA feature, in addition to the terminal device having one PCell, the network device may further configure one or more SCells for the terminal device. The standard specifies that the aggregated carriers belong to the same base station, and all the aggregated carriers use the same cell radio network temporary identifier (C-RNTI). The base station ensures that C-RNTI does not conflict in the cell where each carrier is located.

Figure 2B:
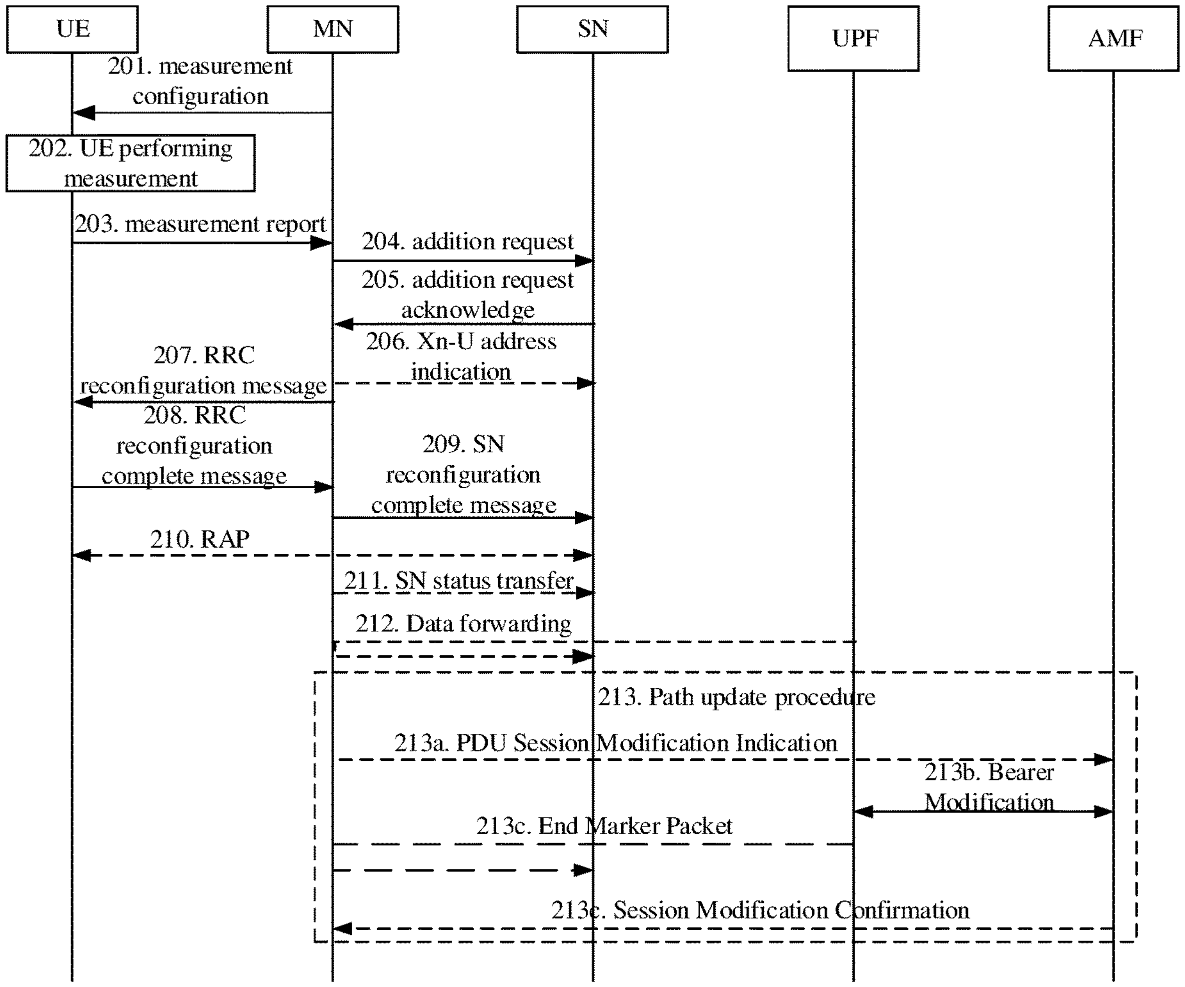
FIG. 2B is a schematic view of a flow of a dual connection establishment process according to an embodiment of the present disclosure.

In a conventional dual connection establishment process, the network device needs to send a measurement configuration for the terminal device, and the terminal device performs a measurement on a frequency point corresponding to a potential primary secondary cell (PSCell) according to the measurement configuration and reports it to the network device. Finally, the network device selects a suitable secondary node (SN) to initiate the dual connection establishment process for the terminal device based on the measurement result of the terminal device, as shown in FIG. 2B, which is a schematic view of a flow of a dual connection establishment process. The process may be performed by an interaction between UE, master node (MN), SN, User Port Function (UPF), and AuthenticationManagementFunction (AMF) on the network side, which may be referred to TS 37.340.

Step 201: The MN sends a measurement configuration to the UE.

Step 202: The UE performs a measurement.

Step 203: The UE sends a measurement report to the MN.

After performing Step 201 to 203 above, the MN initiates an SN addition request to a suitable target SN to add a secondary node to the terminal device to improve the throughput rate.

Step 204: The MN sends an SN addition request to the SN.

Step 205. The SN sends an SN addition request acknowledge to the MN.

Step 206. The MN sends an Xn-U address indication to the SN.

Among them, gNB and ng-eNB are connected to each other through an Xn interface, gNB/ng-eNB is connected to Access and Mobility Management Function (AMF) through an NG-C interface and to User Plane Function (UPF) through an NG-U interface.

Step 207: The MN sends an RRC reconfiguration message to the UE.

Step 208: The UE sends an RRC reconfiguration complete message to the MN.

Step 209: The MN sends an SN reconfiguration complete message to the SN.

Step 210: Random access procedure (RAP).

Step 211: The MN sends an SN status transfer to the SN.

Step 212: Data forwarding.

Step 213: Path update procedure.

Specifically, the path update procedure includes the following steps.

Step 213*a*: PDU Session Modification Indication.

Step 213*b*: Bearer Modification11.

Step 213*c*: End Marker Packet12PDU.

Step 213*c*: PDU Session Modification Confirmation.

As can be seen from the above process, before the MN initiates the SN addition request to the suitable target SN, the system needs to go through the steps of sending measurement configuration to the terminal device, measurement by the terminal device, and reporting the measurement result by the terminal device to the MN, which is a very time-consuming process. In order to save time and overhead, and to quickly add auxiliary nodes to the terminal device to improve throughput, mechanism related to early measurement is introduced in R16, 3GPP RAN2.

When early measurement is applied, the network device sends to the terminal device measurement frequency information (idleModeMeasurement configuration) that the terminal device needs to prepare for adding SN in the idle state. Specifically, the network device sends this measurement frequency information to the terminal device through the RRC used to convert the terminal device to Specifically, the network device sends the measurement frequency information to the terminal device via an RRCRelease message configured to switch the terminal device to the idle mode or an SIB broadcast, and the terminal device receives the measurement frequency information and needs to conduct signal quality measurements in the idle state according to the idleModeMeasurement configuration.

IEs about the measurement frequency information (idleModeMeasurement configuration) for adding SN in the idle state are shown as follows.

As shown in the following IE, the UE variable VarMeasIdleConfig includes the configuration of the measurements to be performed by the UE while in RRC_IDLE or RRC_INACTIVE for NR inter-frequency and inter-RAT (i.e., EUTRA) measurements.

VarMeasIdleConfig

The UE variable VarMeasIdleConfig includes the configuration of the measurements to be performed by the UE while in RRC_IDLE or RRC_INACTIVE for NR inter-frequency and inter-RAT (i.e. EUTRA) measurements.

VarMeasIdleConfig UE variable

```
-- ASN1START
-- TAG-VARMEASIDLECONFIG-START
VarMeasIdleConfig-r16 ::= SEQUENCE {
   measIdleCarrierListNR-r16 SEQUENCE (SIZE (1..maxFreqIdle-r16)) OF
   MeasIdleCarrierNR-
r16 OPTIONAL,
   measIdleCarrierListEUTRA-r16 SEQUENCE (SIZE (1..maxFreqIdle-r16)) OF
MeasIdleCarrierEUTRA-r16 OPTIONAL,
   measIdleDuration-r16 ENUMERATED {sec 10, sec30, sec60, sec120, sec 80, sec240, sec300,
spare},
```

-continued

| VarMeasIdleConfig UE variable |
|---|
| validityAreaList-r16 ValidityAreaList-r16 OPTIONAL<br>}<br>-- TAG-VARMEASIDLECONFIG-STOP<br>-- ASN1STOP |

From the above measurement configuration, it can be seen that the duration of the measurement related to the execution of idle mode (idleMode) by the terminal device is given by the measureIdleDuration-r16 (carried in the RRCRelease message), and the start time of the measurement related to the execution of idle mode (idleMode) by the terminal device is given by the time when the terminal device receives the RRCRelease message and enters the idle state.

When the terminal device returns to the connected state, if msg3 receives an RRC Setup msg/RRC Resume msg, the terminal device first needs to check whether the System Information Block (SIB) contains flag bits for NR-based idle mode measurement parameters (idleModeMeasurementsNR) or EUTRA-based idle mode measurement parameters (idleModeMeasurementsEUTRA). If the flag bit is included in the SIB, the terminal device needs to include flag bits for idle measurement data available (idleMeasAvailable) in an RRCSetupComplete/RRCResumeComplete message. When the network device receives the idleMeasAvailable message, the network device may send a UE InformationRequest (UEInformationRequest) containing flag bits for idle mode measurement request (idleModeMeasurementReq) to the terminal device to request idle mode measurement data from the terminal device. After receiving the UEInformationRequest, the terminal device may send an idleModeMeasurement report to the network device via UEInformationResponse, and the idleModeMeasurement report may be MeasResultIdleEUTRA or MeasResultIdleNR. The following are IE contents related to MeasResultIdleEUTRA and MeasResultIdleNR respectively.

(1) IEs Related to MeasResultIdleEUTRA

```
- MeasResultIdleEUTRA
The IE MeasResultIdleEUTRA covers the E-UTRA measurement results performed in
RRC_IDLE
and RRC_INACTIVE.
MeasResultIdleEUTRA information element
-- ASN1START
-- TAG-MEASRESULTIDLEEUTRA-START
MeasResultIdleEUTRA-r16 ::= SEQUENCE {
   measResultsPerCarrierListIdleEUTRA-r16 SEQUENCE (SIZE (1.. maxFreqIdle-r16)) OF
MeasResultsPerCarrierIdleEUTRA-r16,
   ...
}
MeasResultsPerCarrierIdleEUTRA-r16 ::= SEQUENCE {
   carrierFreqEUTRA-r16 ARFCN-ValueEUTRA,
   measResultsPerCellListIdleEUTRA-r16 SEQUENCE (SIZE (1..maxCellMeasIdle-r16)) OF
MeasResultsPerCellIdleEUTRA-r16,
   ...
}
MeasResultsPerCellIdleEUTRA-r16 ::= SEQUENCE {
   eutra-PhysCellId-r16            EUTRA-PhysCellId,
   measIdleResultEUTRA-r16           SEQUENCE {
      rsrp-ResultEUTRA-r16            RSRP-RangeEUTRA        OPTIONAL,
      rsrq-ResultEUTRA-r16          RSRQ-RangeEUTRA-r16      OPTIONAL
   },
   ...
}
-- TAG-MEASRESULTIDLEEUTRA-STOP
-- ASN1STOP
```

(2) IEs related to MeasResultIdleNR

```
-MeasResultIdleNR
The IE MeasResultIdleNR covers the NR measurement results performed in RRC_IDLE and
RRC_INACTIVE.
MeasResultIdleNR information element
-- ASN1START
-- TAG-MEASRESULTIDLENR-START
MeasResultIdleNR-r16 ::= SEQUENCE {
   measResultServingCell-r16 SEQUENCE {
      rsrp-Result-r16 RSRP-Range                                  OPTIONAL,
      rsrq-Result-r16 RSRQ-Range                                   OPTIONAL,
      resultsSSB-Indexes-r16 ResultsPerSSB-IndexList-r16                OPTIONAL
   },
   measResultsPerCarrierListIdleNR-r16 SEQUENCE (SIZE (1.. maxFreqIdle-r16)) OF
MeasResultsPerCarrierIdleNR-r16 OPTIONAL,
   ...
```

-continued

```
  }
  MeasResultsPerCarrierIdleNR-r16 ::= SEQUENCE {
    carrierFreq-r16 ARFCN-ValueNR,
    measResultsPerCellListIdleNR-r16 SEQUENCE (SIZE (1..maxCellMeasIdle-r16)) OF
MeasResultsPerCellIdleNR-r16,
    ...
  }
  MeasResultsPerCellIdleNR-r16 ::= SEQUENCE {
    physCellId-r16                PhysCellId,
    measIdleResultNR-r16              SEQUENCE {
      rsrp-Result-r16             RSRP-Range                     OPTIONAL
      rsrq-Result-r16             RSRQ-Range                       OPTIONAL,
      resultsSSB-Indexes-r16            ResultsPerSSB-IndexList-r16            OPTIONAL
    },
    ...
  }
  ResultsPerSSB-IndexList-r16 := SEQUENCE (SIZE (1.. maxNrofIndexesToReport)) OF
ResultsPerSSB-IndexIdle-r16
  ResultsPerSSB-IndexIdle-r16 ::= SEQUENCE {
    ssb-Index-r16               SSB-Index,
    ssb-Results-r16               SEQUENCE {
      ssb-RSRP-Result-r16             RSRP-Range                     OPTIONAL,
      ssb-RSRQ-Result-r16               RSRQ-Range                     OPTIONAL
    }                                                           OPTIONAL
  }
  -- TAG-MEASRESULTIDLENR-STOP
  -- ASN1STOP
```

The network device needs the terminal device to conduct idle mode measurement such that the terminal device can report the idle mode related measurement report immediately after entering the connected state, and the network device can immediately add the suitable SN to the terminal device configuration based on the related measurement report to meet the terminal device's idle service throughput requirements as soon as possible.

With logged MDT in R17, the terminal device may need to record the idle state measurement result in the measurement report. When the network device does not need the idle state measurement result to be reported, but only needs the terminal device to report the measurement result based on cell reselection requirements, the terminal device reporting the idle state measurement results will meaninglessly increase the additional network signaling overhead, and also slow down the network processing measurement reports.

Based on the above problems, embodiments of the present disclosure provide a method, a terminal device, and a network device for indicating to process a measurement result, the terminal device may receive a first indication sent by the network device, the first indication being configured to indicate a way to record the measurement result measured based on an idle mode measurement configuration, and/or, the first indication being configured to indicate a way to report the measurement result measured based on the idle mode measurement configuration. In this way, the terminal device can be informed how to record the measurement result measured based on the idle mode measurement configuration and/or report the measurement result measured based on the idle mode measurement configuration, such that the measurement result measured based on the idle mode measurement configuration can be processed according to the actual needs of the network device, and thus, when the network device does not need the measurement result measured based on the idle mode measurement configuration, the measurement result measured based on the idle mode measurement configuration may be not recorded and/or reported, thereby avoiding meaninglessly increasing the additional network signaling overhead and improving the efficiency of the network device in processing the measurement reports.

Figure 3:
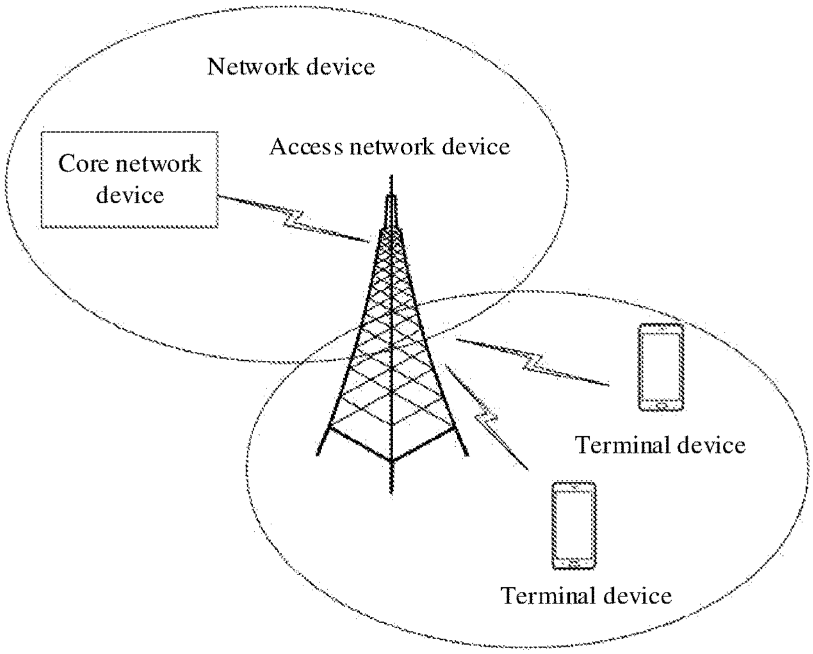
FIG. 3 is a schematic view of an architecture of a wireless communication system according to an embodiment of the present disclosure.

The method for indicating to process a measurement result provided by the embodiments of the present disclosure may be applied to a wireless communication system. Exemplarily, FIG. 3 is a schematic view of an architecture of a wireless communication system according to an embodiment of the present disclosure. Referring to FIG. 3, the wireless communication system includes a terminal device and a network device. In practical applications, the connection between the terminal device and the network device may be a wireless connection.

The terminal device in the embodiments of the present disclosure may be called user equipment (UE). The terminal device may be a personal communication service (PCS) phone, a cordless phone, a session initiation protocol (SIP) phone, a wireless local loop (WLL) station, a personal digital assistant (PDA) station, etc. The terminal device may be mobile phone, mobile station (MS), mobile terminal, laptop computer, etc. The terminal device may communicate with one or more core networks via a radio access network (RAN). For example, the terminal device may be a mobile phone (or "cellular" phone) or a computer with a mobile terminal, etc. For example, the terminal device may be a portable, pocket-sized, handheld, computer-built, or vehicle-mounted mobile device that can exchange voice and/or data with the wireless access network. The terminal device may be handheld device or computing device with wireless communication capabilities, or other processing devices, in-vehicle devices, and wearable devices connected to wireless modems, or terminal devices in future 5G networks or terminal devices in future evolved networks, etc. The above is only an example and is not limited to practical applications.

The network device in the embodiments of the present disclosure may be evolutionary base station (evolutional node B, abbreviated as eNB or e-NodeB), macro base station, micro base station (also called "small base station"), micro base station, access point (AP), transmission point (TP), or new generation base station (new generation Node B, gNodeB), etc. in LTE system, NR communication system, or authorized auxiliary access long-term evolution (LAA-LTE) system. The network device may be other types of network devices in future 5G communication systems or future evolutionary networks.

Figure 4:
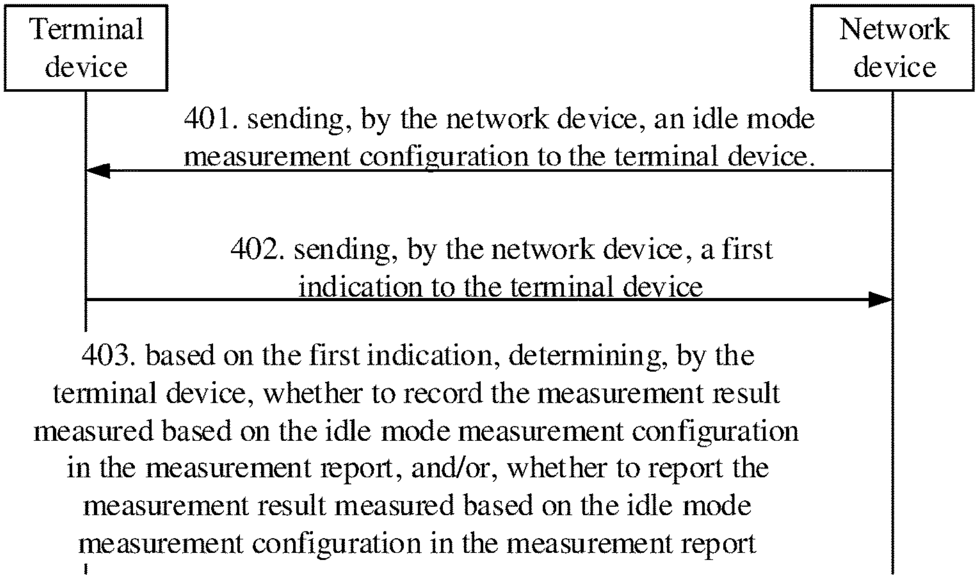
FIG. 4 is a schematic view of a method for indicating to process a measurement result according to an embodiment of the present disclosure.

Referring to FIG. 4, the embodiments of the present disclosure provide a method for indicating to process a measurement result, the method including operations at blocks illustrated herein.

At block 401: sending, by a network device, an idle mode measurement configuration to a terminal device.

At block 402: sending, by the network device, a first indication to the terminal device.

The first indication is configured to indicate the following scenarios.

First case: a way to record a measurement result measured based on the idle mode measurement configuration.

In some embodiments, in the first case, the first indication is configured to indicate one of the following recording ways.

(1) recording the measurement result measured based on the idle mode measurement configuration.

(2) not recording the measurement result measured based on the idle mode measurement configuration.

(3) recording, within a first area, the measurement result measured based on the idle mode measurement configuration.

(4) not recording, within a second area, the measurement result measured based on the idle mode measurement configuration.

In some embodiments, the first indication is indicated by at least one bit.

In some embodiments, the first area and/or the second area, as covered in the embodiments of the present disclosure, is indicated by one of the following information.

At least one cell identification.

At least one tracking area code.

At least one radio access network (RAN) notification area code.

In some embodiments, the at least one cell identification may be a cell identification list that includes one or more cell identifications.

In some embodiments, the at least one tracking area code may be a tracking area code list that includes one or more tracking area codes.

In some embodiments, the at least one RAN notification area code may be an RAN notification area code list that includes one or more RAN notification area codes.

Second case: a way to report the measurement result measured based on the idle mode measurement configuration.

In some embodiments, in the second case, the first indication is configured to indicate one of the following reporting ways.

(a) reporting the measurement result measured based on the idle mode measurement configuration.

(b) not reporting the measurement result measured based on the idle mode measurement configuration.

(c) reporting, within a first area, the measurement result measured based on the idle mode measurement configuration.

(d) not reporting, within a second area, the measurement result measured based on the idle mode measurement configuration.

In some embodiments, the first indication is indicated by at least one bit.

In some embodiments, the first indication may be carried in at least one of the following messages.

Radio resource control (RRC) signaling, Media access control control element (MAC CE), Downlink control information (DCI).

In some embodiments, the RRC signaling may be a logged measurement configuration message.

Exemplarily, a bit may be carried in the RRC signaling to indicate whether the terminal device needs to place the measurement result obtained based on the idle mode measurement configuration in the logged measurement report (logMeasReport-r16) for reporting to the network device.

Third case: a way to record the measurement result measured based on the idle mode measurement configuration and a way to report the measurement result measured based on the idle mode measurement configuration.

In some embodiments, the first indication may be carried in at least one of the following messages.

Radio resource control (RRC) signaling, Media access control control element (MAC CE), Downlink control information (DCI).

At block 403: based on the first indication, determining, by the terminal device, whether to record the measurement result measured based on the idle mode measurement configuration in the measurement report, and/or, whether to report the measurement result measured based on the idle mode measurement configuration in the measurement report.

The step 403 may include three ways of implementation as follows.

Implementation mode I: the terminal device determines, based on the first indication, whether to record the measurement result measured based on the idle mode measurement configuration in the measurement report.

In some embodiments, in the implementation mode I, the terminal device determines, based on the first indication, that the result may be one of the following possible scenarios.

Case 1: when the first indication is configured to indicate recording the measurement result measured based on the idle mode measurement configuration, recording the measurement result measured based on the idle mode measurement configuration in a first measurement report.

Case 2: when the first indication is configured to indicate not recording the measurement result measured based on the idle mode measurement configuration, not recording the measurement result measured based on the idle mode measurement configuration in a second measurement report.

Case 3: when the first indication is configured to indicate recording the measurement result measured based on the idle mode measurement configuration within the first area, recording the measurement result measured based on the idle mode measurement configuration within the first area in a third measurement report.

Case 4: when the first indication is configured to indicate not recording the measurement result measured based on the idle mode measurement configuration within the second area, recording the measurement result measured based on the idle mode measurement configuration in an area other than the second area in a fourth measurement report.

Implementation mode II: the terminal device determines, based on the first indication, whether to report the measurement result measured based on the idle mode measurement configuration in the measurement report.

In some embodiments, in the implementation mode II, the terminal device determines, based on the first indication, that the result may be one of the following possible scenarios.

Case a: when the first indication is configured to indicate reporting the measurement result measured based on the idle mode measurement configuration, reporting a first measurement report to the network device, the first measurement report including the measurement result measured based on the idle mode measurement configuration.

Case b: when the first indication is configured to indicate not reporting the measurement result measured based on the idle mode measurement configuration, reporting a second measurement report to the network device, the second measurement report not including the measurement result measured based on the idle mode measurement configuration.

Case c: when the first indication is configured to indicate reporting the measurement result measured based on the idle mode measurement configuration within the first area, reporting a third measurement report to the network device, the third measurement report including the measurement result measured based on the idle mode measurement configuration within the first area.

Case d: when the first indication is configured to indicate not reporting the measurement result measured based on the idle mode measurement configuration within the second area, reporting a fourth measurement report to the network device, the fourth measurement report including the measurement result measured based on the idle mode measurement configuration in an area other than the second area.

Implementation mode III: based on the first indication, the terminal device determines whether to record the measurement result measured based on the idle mode measurement configuration in the measurement report, and whether to report the measurement result measured based on the idle mode measurement configuration in the measurement report.

In some embodiments, in the implementation mode III, the terminal device determines, based on the first indication, that the result may be one of the following possible scenarios.

Case A: when the first indication is configured to indicate recording the measurement result measured based on the idle mode measurement configuration and reporting the measurement result measured based on the idle mode measurement configuration, recording the measurement result measured based on the idle mode measurement configuration in a first measurement report and reporting the first measurement report to the network device.

Case B: when the first indication is configured to indicate not recording the measurement result measured based on the idle mode measurement configuration and not reporting the measurement result measured based on the idle mode measurement configuration, reporting a second measurement report to the network device, the second measurement report not including the measurement result measured based on the idle mode measurement configuration.

Case C: when the first indication is configured to indicate recording the measurement result measured based on the idle mode measurement configuration within the first area and reporting the measurement result measured based on the idle mode measurement configuration, recording the measurement result measured based on the idle mode measurement configuration within the first area in a third measurement report and reporting the third measurement report to the network device.

Case D: when the first indication is configured to indicate not recording the measurement result measured based on the idle mode measurement configuration within the second area and not reporting the measurement result measured based on the idle mode measurement configuration, recording the measurement result measured based on the idle mode measurement configuration in an area other than the second area in a fourth measurement report and reporting the fourth measurement report to the network device.

In some embodiments, in response to the difference in what the first indication indicates, the terminal device may determine whether to perform a measurement based on the idle mode measurement configuration.

First Measurement Scenario.

When the first indication is configured to indicate recording the measurement result measured based on the idle mode measurement configuration, and/or, the first indication is configured to indicate reporting the measurement result measured based on the idle mode measurement configuration, the method further includes the following operations.

Performing the measurement based on the idle mode measurement configuration while the terminal device is in an idle mode.

Second Measurement Scenario.

When the first indication is configured to indicate not recording the measurement result measured based on the idle mode measurement configuration, and/or, the first indication is configured to indicate not reporting the measurement result measured based on the idle mode measurement configuration, the method further includes the following operations.

Not performing the measurement based on the idle mode measurement configuration while the terminal device is in the idle mode.

Third Possible Measurement Scenario.

When the first indication is configured to indicate recording the measurement result measured based on the idle mode measurement configuration within the first area, and/or, the first indication is configured to indicate reporting the measurement result measured based on the idle mode measurement configuration within the first area, the method further includes the following operations.

Performing the measurement based on the idle mode measurement configuration while the terminal device is in the idle mode and while the terminal device is within the first area.

Fourth Possible Measurement Scenario.

When the first indication is configured to indicate not recording the measurement result measured based on the idle mode measurement configuration within the second area, and/or, the first indication is configured to indicate not reporting the measurement result measured based on the idle mode measurement configuration within the second area, the method further includes the following operations.

Performing the measurement based on the idle mode measurement configuration while the terminal device is in the idle mode and while the terminal device is not within the second area; and not performing the measurement based on the idle mode measurement configuration while the terminal device is within the second area.

In some embodiments, the network device may further indicate to the terminal device the mode of the measurement based on the idle mode measurement configuration.

In some embodiments, the following measurement modes may be indicated.

Measurement mode 1: performing the measurement based on the idle mode measurement configuration while the terminal device is in the idle mode.

Measurement mode 2: not performing the measurement based on the idle mode measurement configuration while the terminal device is in the idle mode.

Measurement mode 3: performing the measurement based on the idle mode measurement configuration while the terminal device is in the idle mode and the terminal device is within the first area.

Measurement mode 4: not performing the measurement based on the idle mode measurement configuration measured while the terminal device is within the second area.

In the embodiments of the present disclosure, the terminal device may receive a first indication sent by the network device, the first indication being configured to indicate a way to record the measurement result measured based on an idle mode measurement configuration, and/or, the first indication being configured to indicate a way to report the measurement result measured based on the idle mode measurement configuration. In this way, the terminal device can be informed how to record the measurement result measured based on the idle mode measurement configuration and/or report the measurement result measured based on the idle mode measurement configuration, such that the measurement result measured based on the idle mode measurement configuration can be processed according to the actual needs of the network device, and thus, when the network device does not need the measurement result measured based on the idle mode measurement configuration, the measurement result measured based on the idle mode measurement configuration may be not recorded and/or reported, thereby avoiding meaninglessly increasing the additional network signaling overhead and improving the efficiency of the network device in processing the measurement reports.

Further, the terminal device may be informed whether and how to perform the measurement based on the idle mode measurement configuration based on the first indication, which may further save time overhead when the network device does not need the measurement result measured based on the idle mode measurement configuration by not performing the measurement based on the idle mode measurement configuration, thereby improving the measurement efficiency of the terminal device and saving power consumption of the terminal device.

Further, the network device may indicate to the terminal device whether the measurement based on the idle mode measurement configuration is required and how to perform the measurement based on the idle mode measurement configuration, such that the terminal device may further refrain from performing the measurement based on the idle mode measurement configuration according to the indication of the network device when the network device does not need the measurement result measured based on the idle mode measurement configuration, thereby further saving time overhead, improving the measurement efficiency of the terminal device, and saving the power consumption of the terminal device.

Figure 5:
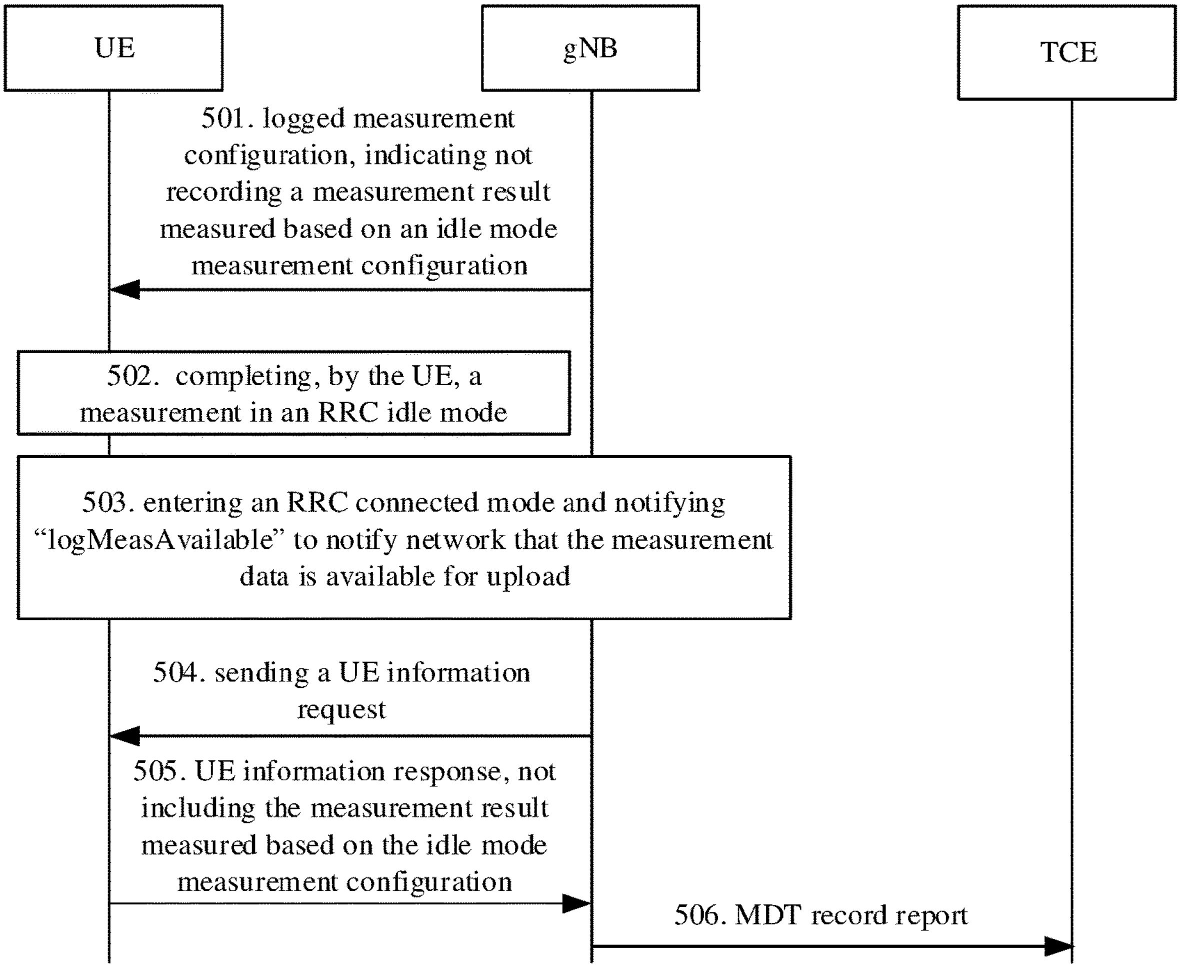
FIG. 5 is a schematic view of a method, indicated by a gNB, for not recording a measurement result measured based on an idle mode measurement configuration according to an embodiment of the present disclosure.

Referring to FIG. 5, FIG. 5 is a schematic view of a method, indicated by a gNB, for not recording a measurement result measured based on an idle mode measurement configuration according to an embodiment of the present disclosure. The method includes operations at blocks illustrated herein.

At block 501: sending, by the gNB, a logged measurement configuration to UE, where the logged measurement configuration indicates not recording a measurement result measured based on an idle mode measurement configuration.

At block 502: completing, by the UE, a measurement in an RRC idle mode.

In the case that the measurement result measured based on the idle mode measurement configuration is not recorded, the measurement may be performed not based on the idle mode measurement configuration.

In a case that the network device needs measurement results for other cell reselection, cell switching and other parameters, measurements are still performed for cell reselection, cell switching and other parameters and recorded in the measurement report.

In some embodiments, the RRC idle mode means an RRC idle state or RRC inactive state.

At block 503: entering an RRC connected mode and notifying "logged measurement data available (logMeasAvailable)" to notify network that the measurement data is available for upload.

The step 503 may be executed when measured parameters are available in the terminal device.

The RRC connected mode is RRC connected state.

At block 504: sending, by the gNB, a UE information request to the UE to request the logged measurement data.

At block 505: sending, by the UE, a UE information response to the gNB, where the UE information response does not include the measurement result measured based on the idle mode measurement configuration.

At block 506: sending, by the gNB, an MDT record report to the TCE.

The MDT record report does not include the measurement result measured based on the idle mode measurement configuration.

The UE information response may not record the measurement result measured based on the idle mode measurement configuration in response to the network device indicating to the terminal device, via the first indication, not recording the measurement result measured based on the idle mode measurement configuration.

In the embodiments, the terminal device may receive the first indication from the network device, and the first indication is configured to indicate not recording the measurement result measured based on the idle mode measurement configuration, such that the terminal device may not record the measurement result measured based on the idle mode measurement configuration when the network device does not need the measurement result measured based on the idle mode measurement configuration, thereby avoiding meaninglessly increasing additional network signaling overhead and improving the efficiency of network devices in processing measurement reports.

Figure 6:
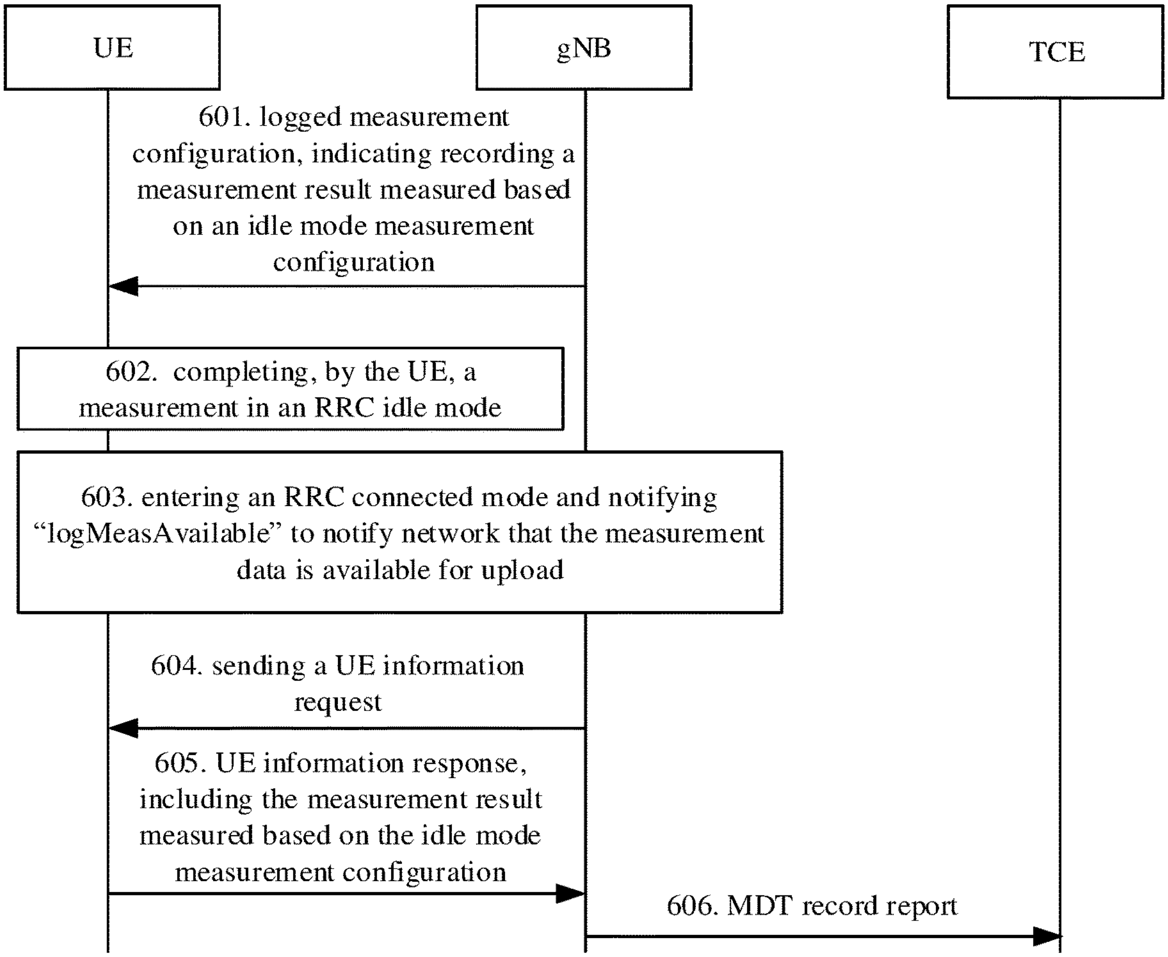
FIG. 6 is a schematic view of a method, indicated by a network device, for recording a measurement result measured based on an idle mode measurement configuration according to an embodiment of the present disclosure.

Referring to FIG. 6, FIG. 6 is a schematic view of a method, indicated by a network device, for recording a measurement result measured based on an idle mode measurement configuration according to an embodiment of the present disclosure. The method includes operations at blocks illustrated herein.

At block 601: sending, by the gNB, a logged measurement configuration to UE, where the logged measurement configuration indicates recording a measurement result measured based on an idle mode measurement configuration.

At block 602: completing, by the UE, a measurement in an RRC idle mode.

In the case that the measurement result measured based on the idle mode measurement configuration is recorded, the measurement may be performed based on the idle mode measurement configuration and recorded in the measurement report.

In a case that the network device needs measurement results for other cell reselection, cell switching and other parameters, measurement may also be performed for cell reselection, cell switching and other parameters and recorded in the measurement report.

At block 6031: entering an RRC connected mode and indicating "logged measurement data available" to notify network that the measurement data is available for upload.

The step 603 may be executed when measurement parameters obtained from the measurement are available in the terminal device.

At block 604: sending, by the gNB, a UE information request to the UE to request the logged measurement data.

At block 605: sending, by the UE, a UE information response to the gNB, where the UE information response includes the measurement result measured based on the idle mode measurement configuration.

At block 606: sending, by the gNB, an MDT record report to the TCE.

The MDT record report includes the measurement result measured based on the idle mode measurement configuration.

The UE information response may record the measurement result measured based on the idle mode measurement configuration in response to the network device indicating to the terminal device, via the first indication, recording the measurement result measured based on the idle mode measurement configuration.

In the embodiments, the terminal device may receive the first indication from the network device, and the first indication is configured to indicate recording the measurement result measured based on the idle mode measurement configuration, such that the terminal device may record the measurement result measured based on the idle mode measurement configuration when the network device needs the measurement result measured based on the idle mode measurement configuration, and the measurement result may be recorded and reported according to the actual needs of the network device, thereby realizing the flexible reporting of measurement results.

Figure 7:
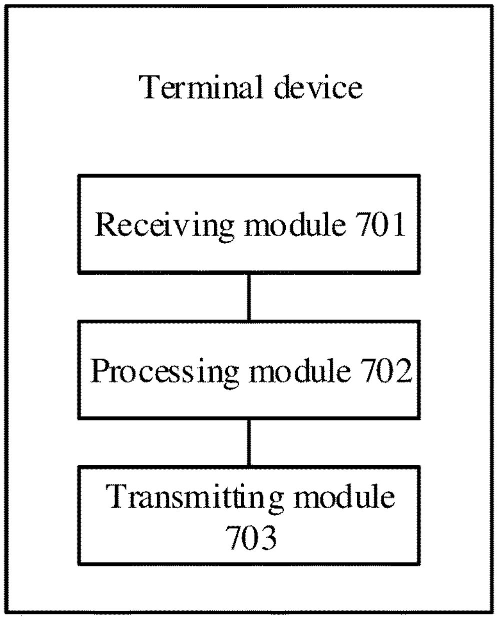
FIG. 7 is a structural schematic view of a terminal device according to an embodiment of the present disclosure.

Referring to FIG. 7, the embodiments of the present disclosure further provide a terminal device, including the following elements.

A receiving module 701, configured to receive a first indication sent by the network device, where the first indication is configured to indicate a way to record a measurement result measured based on an idle mode measurement configuration, and/or, to indicate a way to report the measurement result measured based on the idle mode measurement configuration.

In some embodiments, when the first indication is configured to indicate a way to record the measurement result measured based on the idle mode measurement configuration, the terminal device further includes the following elements.

A processing module 702, configured to determine, based on the first indication, whether to record the measurement result measured based on the idle mode measurement configuration in a measurement report.

In some embodiments, the first indication is configured to indicate one of the following recording ways.

Recording the measurement result measured based on the idle mode measurement configuration.

Not recording the measurement result measured based on the idle mode measurement configuration.

Recording, within a first area, the measurement result measured based on the idle mode measurement configuration.

Not recording, within a second area, the measurement result measured based on the idle mode measurement configuration.

In some embodiments, the processing module 702 is specifically configured to record the measurement result measured based on the idle mode measurement configuration in a first measurement report when the first indication is configured to indicate recording the measurement result measured based on the idle mode measurement configuration.

Or, the processing module 702 is configured to not record the measurement result measured based on the idle mode measurement configuration in a second measurement report when the first indication is configured to indicate not recording the measurement result measured based on the idle mode measurement configuration.

Or, the processing module 702 is configured to record the measurement result measured based on the idle mode measurement configuration within the first area in a third measurement report when the first indication is configured to indicate recording the measurement result measured based on the idle mode measurement configuration within the first area.

Or, the processing module 702 is configured to record the measurement result measured based on the idle mode measurement configuration in an area other than the second area in a fourth measurement report when the first indication is configured to indicate not recording the measurement result measured based on the idle mode measurement configuration within the second area.

In some embodiments, when the first indication is configured to indicate a way to report the measurement result measured based on the idle mode measurement configuration, the terminal device further includes the following elements.

A transmitting module 703, configured to report a logged measurement report to the network device based on the first indication.

In some embodiments, the first indication is configured to indicate one of the following reporting ways.

Reporting the measurement result measured based on the idle mode measurement configuration.

Not reporting the measurement result measured based on the idle mode measurement configuration.

Reporting, within a first area, the measurement result measured based on the idle mode measurement configuration.

Not reporting, within a second area, the measurement result measured based on the idle mode measurement configuration.

In some embodiments, the processing module 702 is specifically configured to report a first measurement report to the network device when the first indication is configured to indicate reporting the measurement result measured based on the idle mode measurement configuration, the first measurement report including the measurement result measured based on the idle mode measurement configuration.

Or, the processing module 702 is configured to report a second measurement report to the network device when the first indication is configured to indicate not reporting the measurement result measured based on the idle mode measurement configuration, the second measurement report not including the measurement result measured based on the idle mode measurement configuration.

Or, the processing module 702 is configured to report a third measurement report to the network device when the first indication is configured to indicate reporting the measurement result measured based on the idle mode measurement configuration within the first area, the third measurement report including the measurement result measured based on the idle mode measurement configuration within the first area.

Or, the processing module 702 is configured to report a fourth measurement report to the network device when the first indication is configured to indicate not reporting the measurement result measured based on the idle mode measurement configuration within the second area, the fourth measurement report including the measurement result measured based on the idle mode measurement configuration in an area other than the second area.

In some embodiments, when the first indication is configured to indicate recording the measurement result measured based on the idle mode measurement configuration and/or the first indication is configured to indicate reporting the measurement result measured based on the idle mode measurement configuration, the processing module is further configured to perform a measurement based on the idle mode measurement configuration while the terminal device is in an idle mode.

In some embodiments, when the first indication is configured to indicate not recording the measurement result measured based on the idle mode measurement configuration, and/or, the first indication is configured to indicate not reporting the measurement result measured based on the idle mode measurement configuration, the processing module is further configured to not perform the measurement based on the idle mode measurement configuration while the terminal device is in the idle mode.

In some embodiments, the first indication is indicated by at least one bit.

In some embodiments, when the first indication is configured to indicate recording the measurement result measured based on the idle mode measurement configuration within the first area, and/or, the first indication is configured to indicate reporting the measurement result measured based on the idle mode measurement configuration within the first area, the processing module 702 is further configured to perform the measurement based on the idle mode measurement configuration while the terminal device is in the idle mode and while the terminal device is within the first area.

In some embodiments, when the first indication is configured to indicate not recording the measurement result measured based on the idle mode measurement configuration within the second area, and/or, the first indication is configured to indicate not reporting the measurement result measured based on the idle mode measurement configuration within the second area, the processing module 702 is further configured to perform the measurement based on the idle mode measurement configuration while the terminal device is in the idle mode and while the terminal device is not within the second area and not perform the measurement based on the idle mode measurement configuration while the terminal device is within the second area.

In some embodiments, the terminal device being in the idle mode includes the following.

The terminal device is in an RRC idle state.

Or, the terminal device is in an RRC inactive state.

In some embodiments, the first area and/or the second area is indicated by one of the following information.

At least one cell identification.

At least one tracking area code.

At least one radio access network (RAN) notification area code.

In some embodiments, the first indication may be carried in at least one of the following messages.

Radio resource control (RRC) signaling, Media access control control element (MAC CE), Downlink control information (DCI).

In some embodiments, the RRC signaling is a logged measurement configuration message.

Figure 8:
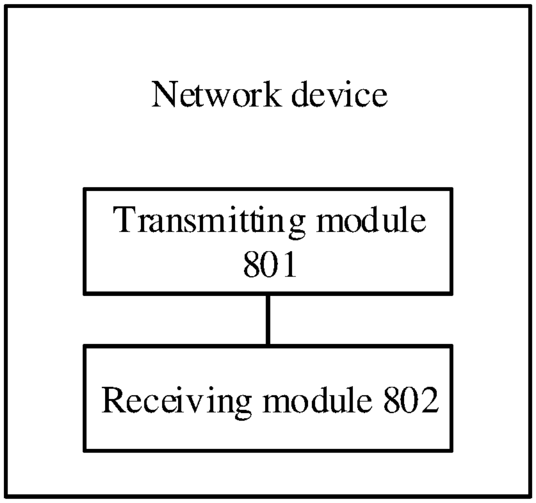
FIG. 8 is a structural schematic view of a network device according to an embodiment of the present disclosure.

Referring to FIG. 8, the embodiments of the present disclosure further provide a network device, including the following elements.

A transmitting module 801, configured to send a first indication to the terminal device, where the first indication is configured to indicate a way to record a measurement result measured based on an idle mode measurement configuration, and/or, to indicate a way to report the measurement result measured based on the idle mode measurement configuration.

In some embodiments, the first indication is configured to indicate one of the following recording ways.

Recording the measurement result measured based on the idle mode measurement configuration.

Not recording the measurement result measured based on the idle mode measurement configuration.

Recording, within a first area, the measurement result measured based on the idle mode measurement configuration.

Not recording, within a second area, the measurement result measured based on the idle mode measurement configuration.

In some embodiments, the first indication is configured to indicate one of the following reporting ways.

Reporting the measurement result measured based on the idle mode measurement configuration.

Not reporting the measurement result measured based on the idle mode measurement configuration.

Reporting, within a first area, the measurement result measured based on the idle mode measurement configuration.

Not reporting, within a second area, the measurement result measured based on the idle mode measurement configuration.

In some embodiments, when the first indication is configured to indicate recording the measurement result measured based on the idle mode measurement configuration, and/or, the first indication is configured to indicate reporting the measurement result measured based on the idle mode measurement configuration, the network device further includes the following elements.

A receiving module 802, configured to receive a first measurement report reported by the terminal device.

The first measurement report includes the measurement result measured based on the idle mode measurement configuration.

In some embodiments, when the first indication is configured to indicate not recording the measurement result measured based on the idle mode measurement configuration, and/or, the first indication is configured to indicate not reporting the measurement result measured based on the idle mode measurement configuration, the network device further includes the following elements.

A receiving module 802, configured to receive a second measurement report reported by the terminal device.

The second measurement report does not include the measurement result measured based on the idle mode measurement configuration.

In some embodiments, when the first indication is configured to indicate recording the measurement result measured based on the idle mode measurement configuration within the first area, and/or, the first indication is configured to indicate reporting the measurement result measured based on the idle mode measurement configuration within the first area, the network device further includes the following elements.

A receiving module 802, configured to receive a third measurement report reported by the terminal device.

The third measurement report includes the measurement result measured based on the idle mode measurement configuration within the first area.

In some embodiments, when the first indication is configured to indicate not recording the measurement result measured based on the idle mode measurement configuration within the second area, and/or, the first indication is configured to indicate not reporting the measurement result measured based on the idle mode measurement configuration within the second area, the network device further includes the following elements.

A receiving module 802, configured to receive a fourth measurement report reported by the terminal device.

The fourth measurement report includes the measurement result measured based on the idle mode measurement configuration in an area other than the second area.

In some embodiments, the first area and/or the second area is indicated by one of the following information.

At least one cell identification.

At least one tracking area code.

At least one radio access network (RAN) notification area code.

In some embodiments, the first indication may be carried in at least one of the following messages.

Radio resource control (RRC) signaling, Media access control control element (MAC CE), Downlink control information (DCI).

In some embodiments, the RRC signaling is a logged measurement configuration message.

The embodiments of the present disclosure further provide a terminal device including: a memory storing an executable program code, and a processor coupled to the memory.

The processor is configured to call the executable program code stored in the memory to perform the method performed by the terminal device in the embodiments of the present disclosure.

The embodiments of the present disclosure further provide a network device including: a memory storing an executable program code, and a processor coupled to the memory.

The processor calls the executable program code stored in the memory to perform the method performed by the network device in the embodiments of the present disclosure.

Figure 9:
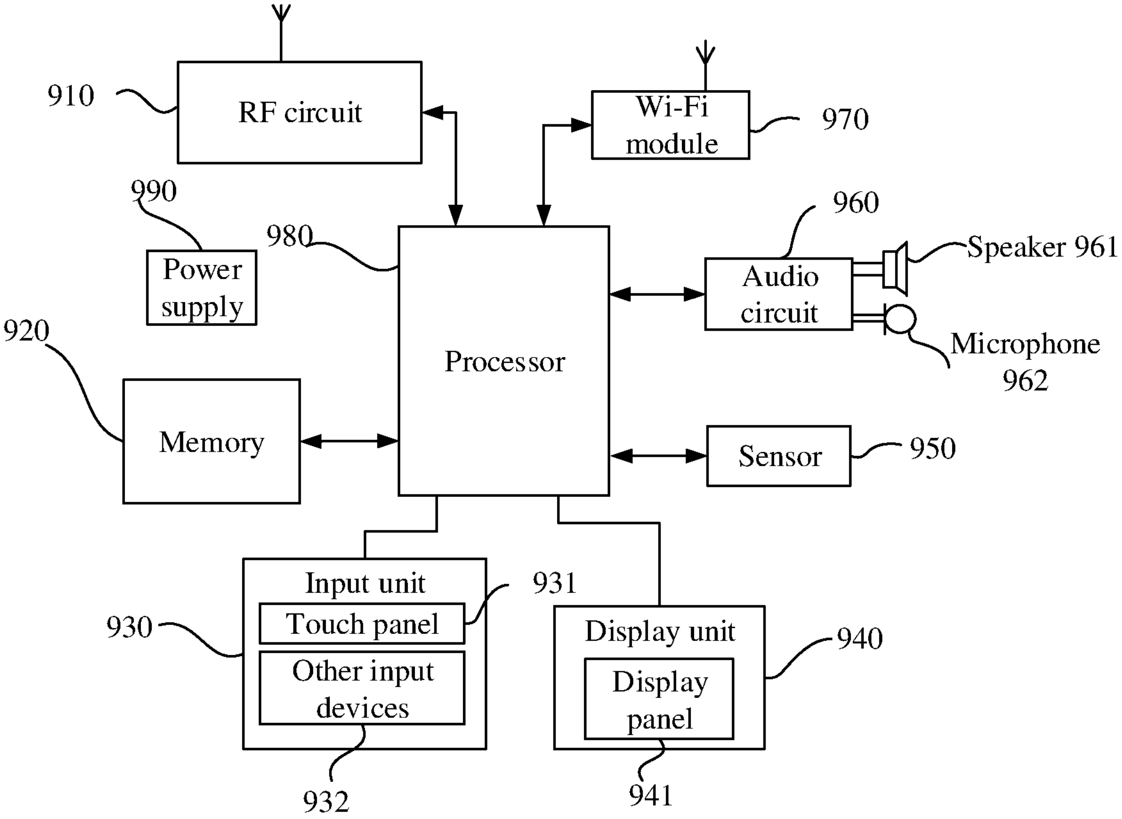
FIG. 9 is a structural schematic view of a mobile phone according to an embodiment of the present disclosure.

Exemplarily, the terminal device in the embodiments of the present disclosure may be a mobile phone, as shown in FIG. 9, which may include: a radio frequency (RF) circuit 910, a memory 920, an input unit 930, a display unit 940, a sensor 950, an audio circuit 960, a wireless fidelity (Wi-Fi) module 970, a processor 980, a power supply 990, etc. The RF circuit 910 includes a receiver 911 and a transmitter 912. It will be understood by those skilled in the art that the structure of the mobile phone illustrated in FIG. 9 does not constitute a limitation of the mobile phone and may include more or fewer components than illustrated, or a combination of certain components, or a different arrangement of components.

The RF circuit 910 may be configured for receiving and sending signals during sending and receiving messages or calls, in particular, receiving downlink information from the base station and passing it to the processor 980 for processing; in addition, sending data designed for uplink to the base station. Typically, the RF circuit 910 includes, but is not limited to, an antenna, at least one amplifier, a transceiver, a coupler, a low noise amplifier (LNA), a duplexer, etc. In addition, the RF circuit 910 may also communicate with networks and other devices via wireless communication. The above wireless communications may adopt any of communication standards or protocols, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 920 may be configured to store software programs and modules, and the processor 980 performs various functional applications and data processing of the mobile phone by running the software programs and modules stored in the memory 920. The memory 920 may primarily include a memory program area and a memory data area, where the memory program area may store the operating system, applications required for at least one function (e.g., sound playback function, image playback function, etc.), etc., and the memory data area may store data created according to the use of the mobile phone (e.g., audio data, phone book, etc.), etc. In addition, the memory 920 may include high-speed random-access memory and may also include non-volatile memory, such as at least one disk memory device, flash memory device, or other volatile solid state memory device.

The input unit 930 may be configured to receive input numeric or character information, as well as to generate key signal input related to user settings of the mobile phone and control of functions. Specifically, the input unit 930 may include a touch panel 931 as well as other input devices 932. The touch panel 931, also referred to as a touch screen, may collect user touch operations on or near it (e.g., user operations on or near the touch panel 931 using any suitable object or attachment such as a finger, stylus, etc.) and drive the corresponding connection device according to a predetermined program. In some embodiments, the touch panel 931 may include two parts: a touch detection device and a touch controller. The touch detection device detects the user's touch orientation, detects the signal brought by the touch operation, and sends the signal to the touch controller; the touch controller receives the touch information from the touch detection device, converts it into contact coordinates, and sends the coordinates to the processor 980, and can receive commands from the processor 980 and execute them. In addition, a variety of types of resistive, capacitive, infrared, and surface acoustic wave may be adopted to implement the touch panel 931. In addition to the touch panel 931, the input unit 930 may further include other input devices 932. specifically, the other input devices 932 may include, but are not limited to, one or more of a physical keyboard, function keys (such as volume control buttons, switch buttons, etc.), trackball, mouse, joystick, etc.

The display unit 940 may be configured to display information entered by or provided to the user and various menus of the mobile phone. The display unit 940 may include a display panel 941. In some embodiments, the display panel 941 may be configured in the form of a liquid crystal display (LCD), organic light-emitting diode (OLED), etc. Further, the touch panel 931 may cover the display panel 941. When the touch panel 931 detects a touch operation on or near it, a signal is transmitted to the processor 980 to determine the type of the touch event, and subsequently the processor 980 provides a corresponding visual output on the display panel 941 based on the type of touch event. Although in FIG. 9, the touch panel 931 and the display panel 941 serve as two separate components to implement the input and output functions of the mobile phone, in some embodiments, the touch panel 931 may be integrated with the display panel 941 to implement the input and output functions of the mobile phone.

The mobile phone may further include at least one sensor 950, such as a light sensor, a motion sensor, and other sensors. Specifically, the light sensor may include an ambient light sensor and a proximity sensor, where the ambient light sensor may adjust the brightness of the display panel 941 based on the brightness of the ambient light, and the proximity sensor may turn off the display panel 941 and/or the backlight when the mobile phone is moved to the ear. As a kind of motion sensor, an accelerometer sensor can detect the magnitude of acceleration in all directions (generally three axes) and the magnitude and direction of gravity when stationary, which can be used for applications that identify the mobile phone's posture (such as horizontal and vertical screen switching, related games, magnetometer posture calibration), vibration recognition-related functions (such as pedometer, tapping), etc. The mobile phone may further be arranged with gyroscope, barometer, hygrometer, thermometer, infrared sensor, and other sensors, which will not be repeated here.

The audio circuit 960, the speaker 961, and the microphone 962 may provide an audio interface between the user and the mobile phone. The audio circuit 960 may transmit the received audio data converted into electrical signals to the speaker 961, which is converted into sound signals output by the speaker 961; on the other hand, the microphone 962 converts the collected sound signal into an electrical signal, which is received by the audio circuit 960 and converted into audio data, and then the audio data is output to the processor 980 for processing and then sent via the RF circuit 910 to, for example, another mobile phone, or the audio data is output to the memory 920 for further processing.

Wi-Fi is a short-range wireless transmission technology, and the mobile phone can help users send and receive email, browse the web, and access streaming media, etc. through the Wi-Fi module 970, which provides wireless broadband Internet access to users. Although the Wi-Fi module 970 is illustrated in FIG. 9, it is understood that it is not a mandatory component of the mobile phone and may be omitted as needed to the extent that it does not change the essence of the present disclosure.

The processor 980 is a control center of the mobile phone and connects various parts of the entire mobile phone using various interfaces and wiring to perform various functions and process data of the mobile phone by running or executing software programs and/or modules stored in the memory 920 and by calling data stored in the memory 920, thereby monitoring the mobile phone. In some embodiments, the processor 980 may include one or more processing units; in some embodiments, the processor 980 may integrate an application processor and a modem processor, where the application processor primarily handles the operating system, user interface, and applications, etc., and the modem processor primarily handles wireless communications. It is understood that the above modem processor may not be integrated into the processor 980.

The mobile phone further includes the power supply 990 (e.g., a battery) to power the various components, and in some embodiments, the power supply may be logically connected to the processor 980 through a power management system, thereby enabling functions such as managing charging, discharging, and power consumption management through the power management system. Although not shown, the mobile phone may further include a camera, Bluetooth module, etc., which will not be described herein.

In the embodiments of the present disclosure, the RF circuit 910 is configured to receive a first indication sent by the network device, where the first indication is configured to indicate a way to record a measurement result measured based on an idle mode measurement configuration, and/or, to indicate a way to report the measurement result measured based on the idle mode measurement configuration.

In some embodiments, when the first indication is configured to indicate a way to record the measurement result measured based on the idle mode measurement configuration, the terminal device further includes the following elements.

The processor 980, configured to determine, based on the first indication, whether to record the measurement result measured based on the idle mode measurement configuration in a measurement report.

In some embodiments, the first indication is configured to indicate one of the following recording ways.

Recording the measurement result measured based on the idle mode measurement configuration.

Not recording the measurement result measured based on the idle mode measurement configuration.

Recording, within a first area, the measurement result measured based on the idle mode measurement configuration.

Not recording, within a second area, the measurement result measured based on the idle mode measurement configuration.

In some embodiments, the processor 980 is specifically configured to record the measurement result measured based on the idle mode measurement configuration in a first measurement report when the first indication is configured to indicate recording the measurement result measured based on the idle mode measurement configuration.

Or, the processor 980 is configured to not record the measurement result measured based on the idle mode measurement configuration in a second measurement report when the first indication is configured to indicate not recording the measurement result measured based on the idle mode measurement configuration.

Or, the processor 980 is configured to record the measurement result measured based on the idle mode measurement configuration within the first area in a third measurement report when the first indication is configured to indicate recording the measurement result measured based on the idle mode measurement configuration within the first area.

Or, the processor 980 is configured to record the measurement result measured based on the idle mode measurementment configuration in an area other than the second area in a fourth measurement report when the first indication is configured to indicate not recording the measurement result measured based on the idle mode measurement configuration within the second area.

In some embodiments, when the first indication is configured to indicate a way to report the measurement result measured based on the idle mode measurement configuration, the terminal device further includes the following elements.

The RF circuit 910, configured to report a logged measurement report to the network device based on the first indication.

In some embodiments, the first indication is configured to indicate one of the following reporting ways.

Reporting the measurement result measured based on the idle mode measurement configuration.

Not reporting the measurement result measured based on the idle mode measurement configuration.

Reporting, within a first area, the measurement result measured based on the idle mode measurement configuration.

Not reporting, within a second area, the measurement result measured based on the idle mode measurement configuration.

In some embodiments, the processor 980 is specifically configured to report a first measurement report to the network device when the first indication is configured to indicate reporting the measurement result measured based on the idle mode measurement configuration, the first measurement report including the measurement result measured based on the idle mode measurement configuration.

Or, the processor 980 is configured to report a second measurement report to the network device when the first indication is configured to indicate not reporting the measurement result measured based on the idle mode measurement configuration, the second measurement report not including the measurement result measured based on the idle mode measurement configuration.

Or, the processor 980 is configured to report a third measurement report to the network device when the first indication is configured to indicate reporting the measurement result measured based on the idle mode measurement configuration within the first area, the third measurement report including the measurement result measured based on the idle mode measurement configuration within the first area.

Or, the processor 980 is configured to report a fourth measurement report to the network device when the first indication is configured to indicate not reporting the measurement result measured based on the idle mode measurement configuration within the second area, the fourth measurement report including the measurement result measured based on the idle mode measurement configuration in an area other than the second area.

In some embodiments, when the first indication is configured to indicate recording the measurement result measured based on the idle mode measurement configuration and/or the first indication is configured to indicate reporting the measurement result measured based on the idle mode measurement configuration, the processor 980 is further configured to perform a measurement based on the idle mode measurement configuration while the terminal device is in an idle mode.

In some embodiments, when the first indication is configured to indicate not recording the measurement result measured based on the idle mode measurement configuration, and/or, the first indication is configured to indicate not reporting the measurement result measured based on the idle mode measurement configuration, the processor 980 is further configured to not perform the measurement based on the idle mode measurement configuration while the terminal device is in the idle mode.

In some embodiments, the first indication is indicated by at least one bit.

In some embodiments, when the first indication is configured to indicate recording the measurement result measured based on the idle mode measurement configuration within the first area, and/or, the first indication is configured to indicate reporting the measurement result measured based on the idle mode measurement configuration within the first area, the processor 980 is further configured to perform the measurement based on the idle mode measurement configuration while the terminal device is in the idle mode and while the terminal device is within the first area.

In some embodiments, when the first indication is configured to indicate not recording the measurement result measured based on the idle mode measurement configuration within the second area, and/or, the first indication is configured to indicate not reporting the measurement result measured based on the idle mode measurement configuration within the second area, the processor 980 is further configured to perform the measurement based on the idle mode measurement configuration while the terminal device is in the idle mode and while the terminal device is not within the second area and not perform the measurement based on the idle mode measurement configuration while the terminal device is within the second area.

In some embodiments, the terminal device being in the idle mode includes the following.

The terminal device is in an RRC idle state.

Or, the terminal device is in an RRC inactive state.

In some embodiments, the first area and/or the second area is indicated by one of the following information.

At least one cell identification.

At least one tracking area code.

At least one radio access network (RAN) notification area code.

In some embodiments, the first indication may be carried in at least one of the following messages.

Radio resource control (RRC) signaling, Media access control control element (MAC CE), Downlink control information (DCI).

In some embodiments, the RRC signaling is a logged measurement configuration message.

Figure 10:
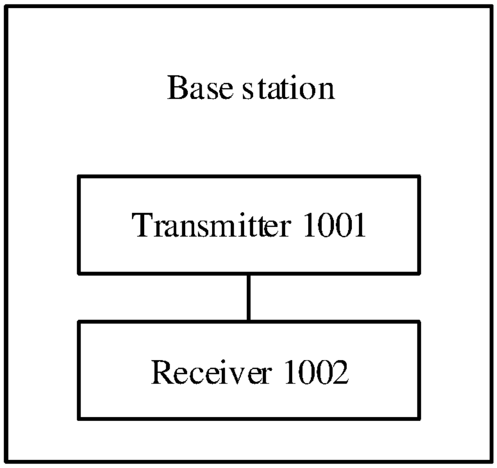
FIG. 10 is a structural schematic view of a base station according to an embodiment of the present disclosure.

Exemplarily, referring to FIG. 10, the network device in the embodiments of the present disclosure may be a base station including the following elements.

A transmitter 1001, configured to send a first indication to the terminal device, where the first indication is configured to indicate a way to record a measurement result measured based on an idle mode measurement configuration, and/or, to indicate a way to report the measurement result measured based on the idle mode measurement configuration.

In some embodiments, the first indication is configured to indicate one of the following recording ways.

Recording the measurement result measured based on the idle mode measurement configuration.

Not recording the measurement result measured based on the idle mode measurement configuration.

Recording, within a first area, the measurement result measured based on the idle mode measurement configuration.

Not recording, within a second area, the measurement result measured based on the idle mode measurement configuration.

In some embodiments, the first indication is configured to indicate one of the following reporting ways.

Reporting the measurement result measured based on the idle mode measurement configuration.

Not reporting the measurement result measured based on the idle mode measurement configuration.

Reporting, within a first area, the measurement result measured based on the idle mode measurement configuration.

Not reporting, within a second area, the measurement result measured based on the idle mode measurement configuration.

In some embodiments, when the first indication is configured to indicate recording the measurement result measured based on the idle mode measurement configuration, and/or, the first indication is configured to indicate reporting the measurement result measured based on the idle mode measurement configuration, the network device further includes the following elements.

A receiver 1002, configured to receive a first measurement report reported by the terminal device.

The first measurement report includes the measurement result measured based on the idle mode measurement configuration.

In some embodiments, when the first indication is configured to indicate not recording the measurement result measured based on the idle mode measurement configuration, and/or, the first indication is configured to indicate not reporting the measurement result measured based on the idle mode measurement configuration, the network device further includes the following elements.

A receiver 1002, configured to receive a second measurement report reported by the terminal device.

The second measurement report does not include the measurement result measured based on the idle mode measurement configuration.

In some embodiments, when the first indication is configured to indicate recording the measurement result measured based on the idle mode measurement configuration within the first area, and/or, the first indication is configured to indicate reporting the measurement result measured based on the idle mode measurement configuration within the first area, the network device further includes the following elements.

A receiver 1002, configured to receive a third measurement report reported by the terminal device.

The third measurement report includes the measurement result measured based on the idle mode measurement configuration within the first area.

In some embodiments, when the first indication is configured to indicate not recording the measurement result measured based on the idle mode measurement configuration within the second area, and/or, the first indication is configured to indicate not reporting the measurement result measured based on the idle mode measurement configuration within the second area, the network device further includes the following elements.

A receiver 1002, configured to receive a fourth measurement report reported by the terminal device.

The fourth measurement report includes the measurement result measured based on the idle mode measurement configuration in an area other than the second area.

In some embodiments, the first area and/or the second area is indicated by one of the following information.

At least one cell identification.

At least one tracking area code.

At least one radio access network (RAN) notification area code.

In some embodiments, the first indication may be carried in at least one of the following messages.

Radio resource control (RRC) signaling, Media access control control element (MAC CE), Downlink control information (DCI).

In some embodiments, the RRC signaling is a logged measurement configuration message.

The embodiments of the present disclosure further provide a computer-readable storage medium including: computer instructions which, when run on a computer, cause the computer to perform various processes of a terminal device as in the method embodiments described above.

The embodiments of the present disclosure further provide a computer-readable storage medium including: computer instructions which, when run on a computer, cause the computer to perform various processes of a network device as in the method embodiments described above.

The embodiments of the present disclosure further provide a computer program product including, computer instructions; when the computer program product is run on a computer, the computer runs the computer instructions such that the computer performs various processes of a terminal device as in the method embodiments described above.

The embodiments of the present disclosure further provide a computer program product including, computer instructions; when the computer program product is run on a computer, the computer runs the computer instructions that cause the computer to perform various processes of a network device as in the method embodiments described above.

The embodiments of the present disclosure further provide a chip coupled with a memory in a terminal device, such that the chip calls the program indications stored in the memory at runtime, causing the terminal device to perform various processes of the terminal device as in the above method embodiments.

The embodiments of the present disclosure further provide a chip coupled with a memory in a network device, such that the chip calls the program indications stored in the memory at runtime, causing the network device to perform various processes of the network device as in the above method embodiments.

In the above embodiments, implementation may be in whole or in part by software, hardware, firmware, or any combination thereof. When implemented using software, it may be implemented in whole or in part in the form of a computer program product. A computer program product includes one or more computer instructions. When loaded and executed on a computer, the computer program instructions produce, in whole or in part, a process or function in accordance with the embodiments of the present disclosure. The computer may be a general-purpose computer, a specialized computer, a computer network, or other programmable device. The computer instructions may be stored in a computer-readable storage medium or transmitted from one computer-readable storage medium to another computer-readable storage medium, e.g., the computer instructions may be transmitted from one web site, computer, server, or data center to another web site via wired (e.g., coaxial cable, fiber optic, digital subscriber line (DSL)) or wireless (e.g., infrared, wireless, microwave, etc.) means. The computer-readable storage medium may be any available media that a computer can store or a data storage device such as a server, data center, etc. that contains one or more available media integrated. The available media may be magnetic media, (e.g., floppy disks, hard disks, magnetic tapes), optical media (e.g., DVDs), or semiconductor media (e.g., solid state disk (SSD)), etc.

The terms "first," "second," "third," "fourth," etc. (if present) in the specification and claims of the present disclosure and in the accompanying drawings above are intended to distinguish similar objects and need not be used to describe a particular order or sequence. It should be understood that the data so used may be interchangeable where appropriate such that the embodiments described herein can be implemented in an order other than what is illustrated or described herein. In addition, the terms "including" and "having", and any variations thereof, are intended to cover non-exclusive inclusion, e.g., a process, method, system, product, or apparatus including a series of steps or units need not be limited to those steps or units that are clearly listed, but may include other steps or units that are not clearly listed or that are inherent to the process, method, product, or apparatus.

What is claimed is:

1. A method for indicating to process a measurement result, comprising:

receiving an idle mode measurement configuration sent by a network device, wherein the idle mode measurement configuration is used for a terminal device to perform measurement in an idle mode; and receiving a first indication sent by the network device, wherein the first indication is indicated by one bit and carried in radio resource control (RRC) signaling, wherein the one bit in the RRC signaling indicates whether the terminal device needs to place a measurement result measured based on the idle mode measurement configuration in a logged measurement report (logMeasReport-r16) for reporting to the network device;

wherein the first indication is configured to indicate a way to report the measurement result measured based on the idle mode measurement configuration, and a way to record the measurement result measured based on the idle mode measurement configuration, wherein the first indication is further configured to indicate whether to perform measurement based on the idle mode measurement configuration;

the way to report the measurement result measured based on the idle mode measurement configuration, comprises:

not reporting the measurement result measured based on the idle mode measurement configuration; and the way to record the measurement result measured based on the idle mode measurement configuration, comprises:

not recording the measurement result measured based on the idle mode measurement configuration;

wherein the method further comprises:

receiving a logged measurement configuration sent by the network device, wherein the logged measurement configuration is configured for the terminal device to measure cell reselection, cell switching in idle state, and other parameters, and indicates not recoding the measurement result measured based on the idle mode measurement configuration; and not performing the measurement based on the idle mode measurement configuration, and reporting a second measurement report to the network device, the second measurement report not including the measurement result measured based on the idle mode measurement configuration, in condition of the first indication being configured to indicate not recording the measurement result measured based on the idle mode measurement configuration and not reporting the measurement result measured based on the idle mode measurement configuration;

wherein the second measurement report comprises other measurement results for the cell reselection, cell switching, and other parameters which are measured based on the logged measurement configuration instead of the idle mode measurement configuration, and the logged measurement configuration is different from the idle mode measurement configuration such that the second measurement report does not include the measurement result measured based on the idle mode measurement configuration.

2. The method according to claim 1, wherein the first indication is configured to indicate reporting the measurement result measured based on the idle mode measurement configuration, and the method further comprises:

performing a measurement based on the idle mode measurement configuration while the terminal device is in an idle mode.

3. The method according to claim 1, wherein the first indication is configured to indicate reporting the measurement result measured based on the idle mode measurement configuration within a first area, and the method further comprises:

performing the measurement based on the idle mode measurement configuration while the terminal device is in the idle mode and in response to the terminal device being within the first area.

4. The method according to claim 1, wherein the first indication is configured to indicate not reporting the measurement result measured based on the idle mode measurement configuration within a second area, and the method further comprises:

performing the measurement based on the idle mode measurement configuration while the terminal device is in the idle mode and in response to the terminal device not being within the second area; and not performing the measurement based on the idle mode measurement configuration in response to the terminal device being within the second area.

5. The method according to claim 1, wherein the method further comprises:

recording the measurement result measured based on the idle mode measurement configuration in a first measurement report and reporting the first measurement report to the network device in condition of the first indication being configured to indicate recording the measurement result measured based on the idle mode measurement configuration and reporting the measurement result measured based on the idle mode measurement configuration;

recording the measurement result measured based on the idle mode measurement configuration within a first area in a third measurement report and reporting the third measurement report to the network device, in condition of the first indication being configured to indicate recording the measurement result measured based on the idle mode measurement configuration within the first area and reporting the measurement result measured based on the idle mode measurement configuration; and recording the measurement result measured based on the idle mode measurement configuration in an area other than a second area in a fourth measurement report and reporting the fourth measurement report to the network device, in condition of the first indication being configured to indicate not recording the measurement result measured based on the idle mode measurement configuration within the second area and not reporting the measurement result measured based on the idle mode measurement configuration.

6. The method according to claim 5, wherein each of the first area and the second area is indicated by one of the following information:

at least one cell identification;

at least one tracking area code; and at least one radio access network (RAN) notification area code.

7. A method for indicating to process a measurement result, comprising:

sending an idle mode measurement configuration to a terminal device, wherein the idle mode measurement configuration is used for a terminal device to perform measurement in an idle mode; and sending a first indication to the terminal device, wherein the first indication is indicated by one bit and carried in radio resource control (RRC) signaling, wherein the one bit in the RRC signaling indicates whether the terminal device needs to place a measurement result measured based on the idle mode measurement configuration in a logged measurement report (logMeasReport-r16) for reporting to the network device;

wherein the first indication is configured to indicate a way to report the measurement result measured based on the idle mode measurement configuration, and a way to record the measurement result measured based on the idle mode measurement configuration, wherein the first indication is further configured to indicate whether to perform measurement based on the idle mode measurement configuration;

the way to report the measurement result measured based on the idle mode measurement configuration, comprises:

not reporting the measurement result measured based on the idle mode measurement configuration; and the way to record the measurement result measured based on the idle mode measurement configuration, comprises:

not recording the measurement result measured based on the idle mode measurement configuration;

wherein the method further comprises:

sending a logged measurement configuration to the terminal device, wherein the logged measurement configuration is configured to measure cell reselection, cell switching, and other parameters, and indicates not recoding the measurement result measured based on the idle mode measurement configuration; and receiving a second measurement report reported by the terminal device, the second measurement report not including the measurement result measured based on the idle mode measurement configuration, in condition of the first indication being configured to indicate not recording the measurement result measured based on the idle mode measurement configuration and not reporting the measurement result measured based on the idle mode measurement configuration;

wherein the second measurement report comprises other measurement results for the cell reselection, cell switching, and other parameters which are measured based on the logged measurement configuration instead of the idle mode measurement configuration, and the logged measurement configuration is different from the idle mode measurement configuration such that the second measurement report does not include the measurement result measured based on the idle mode measurement configuration.

8. A terminal device, comprising a memory and a processor;

wherein the memory stores an instruction; the instruction is executable by the processor to cause the processor to perform a method that comprises:

receiving an idle mode measurement configuration sent by a network device, wherein the idle mode measurement configuration is used for a terminal device to perform measurement in an idle mode; and receiving a first indication sent by the network device, wherein the first indication is indicated by one bit and carried in radio resource control (RRC) signaling, wherein the one bit in the RRC signaling indicates whether the terminal device needs to place a measurement result measured based on the idle mode measurement configuration in a logged measurement report (logMeasReport-r16) for reporting to the network device;

wherein the first indication is configured to indicate a way to report the measurement result measured based on the idle mode measurement configuration, and a way to record the measurement result measured based on the idle mode measurement configuration;

the way to report the measurement result measured based on the idle mode measurement configuration, comprises:

not reporting the measurement result measured based on the idle mode measurement configuration; and the way to record the measurement result measured based on the idle mode measurement configuration, comprises:

not recording the measurement result measured based on the idle mode measurement configuration;

wherein the method further comprises:

receiving a logged measurement configuration sent by the network device, wherein the logged measurement configuration is configured for the terminal device to measure cell reselection, cell switching in idle state, and other parameters, and indicates not recoding the measurement result measured based on the idle mode measurement configuration; and not performing the measurement based on the idle mode measurement configuration, and reporting a second measurement report to the network device, the second measurement report not including the measurement result measured based on the idle mode measurement configuration, in condition of the first indication being configured to indicate not recording the measurement result measured based on the idle mode measurement configuration and not reporting the measurement result measured based on the idle mode measurement configuration;

wherein the second measurement report comprises other measurement results for cell reselection, cell switching, and other parameters which are measured based on the logged measurement configuration instead of the idle mode measurement configuration, and the logged measurement configuration is different from the idle mode measurement configuration such that the second measurement report does not include the measurement result measured based on the idle mode measurement configuration.

* * * * *